US012634346B1

(12) United States Patent
Ryland et al.

(10) Patent No.: US 12,634,346 B1
(45) Date of Patent: May 19, 2026

(54) PER-CUSTOMER TRANSPORT LAYER SECURITY (TLS) CONTROLS IN A MULTI-TENANT PROVIDER NETWORK

(71) Applicant: Amazon Technologies, Inc., Seattle, WA (US)

(72) Inventors: Mark Ryland, Great Falls, VA (US); Christoph Saalfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 18/166,439

(22) Filed: Feb. 8, 2023

(51) Int. Cl.
*H04L 9/40* (2022.01)

(52) U.S. Cl.
CPC ............ *H04L 63/20* (2013.01); *H04L 63/166* (2013.01)

(58) Field of Classification Search
CPC .............................. H04L 63/20; H04L 63/166
See application file for complete search history.

(56) References Cited

U.S. PATENT DOCUMENTS

| | | | | |
|---|---|---|---|---|
| 11,363,072 B1* | 6/2022 | Relan | ........................ | G06F 9/451 |
| 2004/0250112 A1* | 12/2004 | Valente | ................. | H04L 63/166 |
| | | | | 726/14 |
| 2007/0136801 A1* | 6/2007 | Le | ......................... | H04L 63/102 |
| | | | | 726/10 |
| 2017/0099160 A1* | 4/2017 | Mithyantha | ......... | H04L 12/4641 |
| 2023/0403272 A1* | 12/2023 | Cheethirala | ......... | H04L 63/0823 |

OTHER PUBLICATIONS

Eric Rescorla and Tim Dierks, "RFC 5246: Transport Layer Security (TLS) Protocol", https://www.rfc-editor.org/info/rfc5246, Internet Engineering Task Force (IETF Aug. 2008) (Year: 2008).*
Donald E. Eastlake, "RFC 6066: Transport Layer Security (TLS) Extensions: Extension Definitions", https://www.rfc-editor.org/info/rfc6066, Internet Engineering Task Force (IETF Jan. 2011) (hereinafter "RFC 6066") (Year: 2011).*
Eastlake, RFC 6066 Transport Layer Security (TLS) Extensions (IETF Jan. 2011) (Year: 2011).*
Rescorla et al, RFC 5246 Transport Layer Security (TLS) Protocol (IETF Aug. 2008) (Year: 2008).*
Dierks, T., et al., "The TLS Protocol Version 1.0", Network Working Group, RFC: 2246, Jan. 1999, pp. 1-69.

(Continued)

*Primary Examiner* — Theodore C Parsons
(74) *Attorney, Agent, or Firm* — Nicholson DeVos Webster & Elliott LLP

(57) ABSTRACT

Techniques for per-customer transport layer security (TLS) controls in a multi-tenant provider network are described. An Internet Protocol (IP) packet is received that includes a request to establish a TLS session with an application programming interface (API) endpoint of a multi-tenant provider network, the request includes an indication of supported TLS parameters. An indication of permitted TLS parameters is obtained from a customer-defined TLS policy identified based at least in part on an indication of a customer included in the IP packet. The supported TLS parameters are determined to match the permitted TLS parameters, and the requested TLS session is established.

20 Claims, 10 Drawing Sheets

(56)  References Cited

OTHER PUBLICATIONS

Dierks, T., et al., "The Transport Layer Security (TLS) Protocol Version 1.1", Network Working Group, RFC: 4346, Apr. 2006, pp. 1-76.

Dierks, T., et al., "The Transport Layer Security (TLS) Protocol Version 1.2", Network Working Group, RFC: 5246, Aug. 2008, pp. 1-90.

Eastlake, D., et al., "Transport Layer Security (TLS) Extensions: Extension Definitions", Internet Engineering Task Force (IETF), RFC: 6066, Jan. 2011, pp. 1-22.

Rescorla, E., et al., "The Transport Layer Security (TLS) Protocol Version 1.3", Internet Engineering Task Force (IETF), RFC: 8446, Aug. 2018, pp. 1-138.

* cited by examiner

OPERATIONS
700

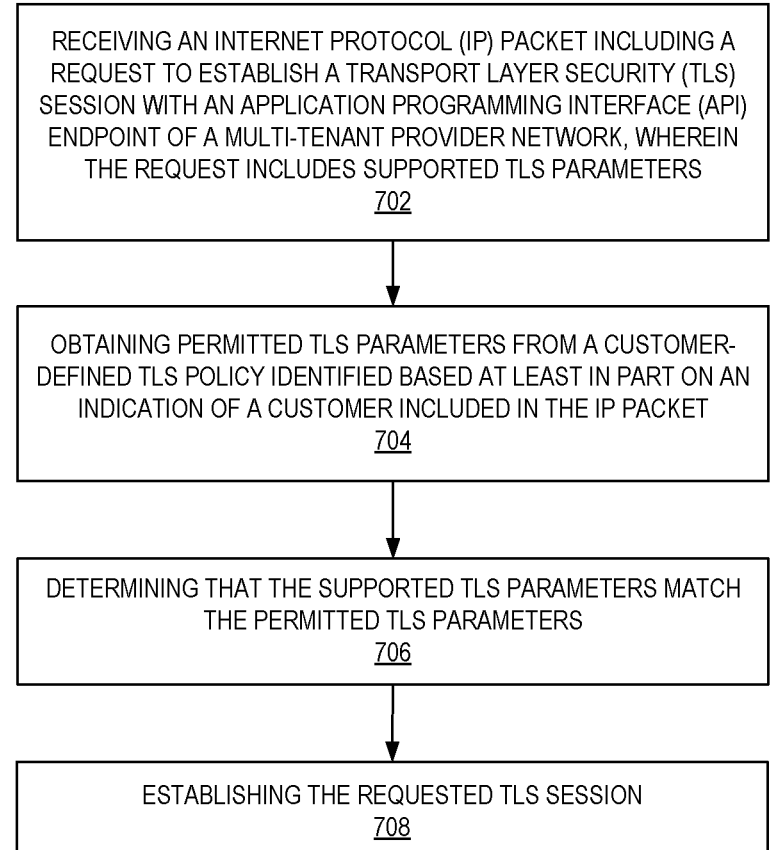

RECEIVING AN INTERNET PROTOCOL (IP) PACKET INCLUDING A REQUEST TO ESTABLISH A TRANSPORT LAYER SECURITY (TLS) SESSION WITH AN APPLICATION PROGRAMMING INTERFACE (API) ENDPOINT OF A MULTI-TENANT PROVIDER NETWORK, WHEREIN THE REQUEST INCLUDES SUPPORTED TLS PARAMETERS
702

OBTAINING PERMITTED TLS PARAMETERS FROM A CUSTOMER-DEFINED TLS POLICY IDENTIFIED BASED AT LEAST IN PART ON AN INDICATION OF A CUSTOMER INCLUDED IN THE IP PACKET
704

DETERMINING THAT THE SUPPORTED TLS PARAMETERS MATCH THE PERMITTED TLS PARAMETERS
706

ESTABLISHING THE REQUESTED TLS SESSION
708

*FIG. 7*

PER-CUSTOMER TRANSPORT LAYER SECURITY (TLS) CONTROLS IN A MULTI-TENANT PROVIDER NETWORK

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers.

BRIEF DESCRIPTION OF DRAWINGS

Various examples in accordance with the present disclosure will be described with reference to the following drawings.

FIG. 7 is a flow diagram illustrating operations of a method for per-customer TLS controls in a multi-tenant provider network according to some examples.

DETAILED DESCRIPTION

Figure 1:
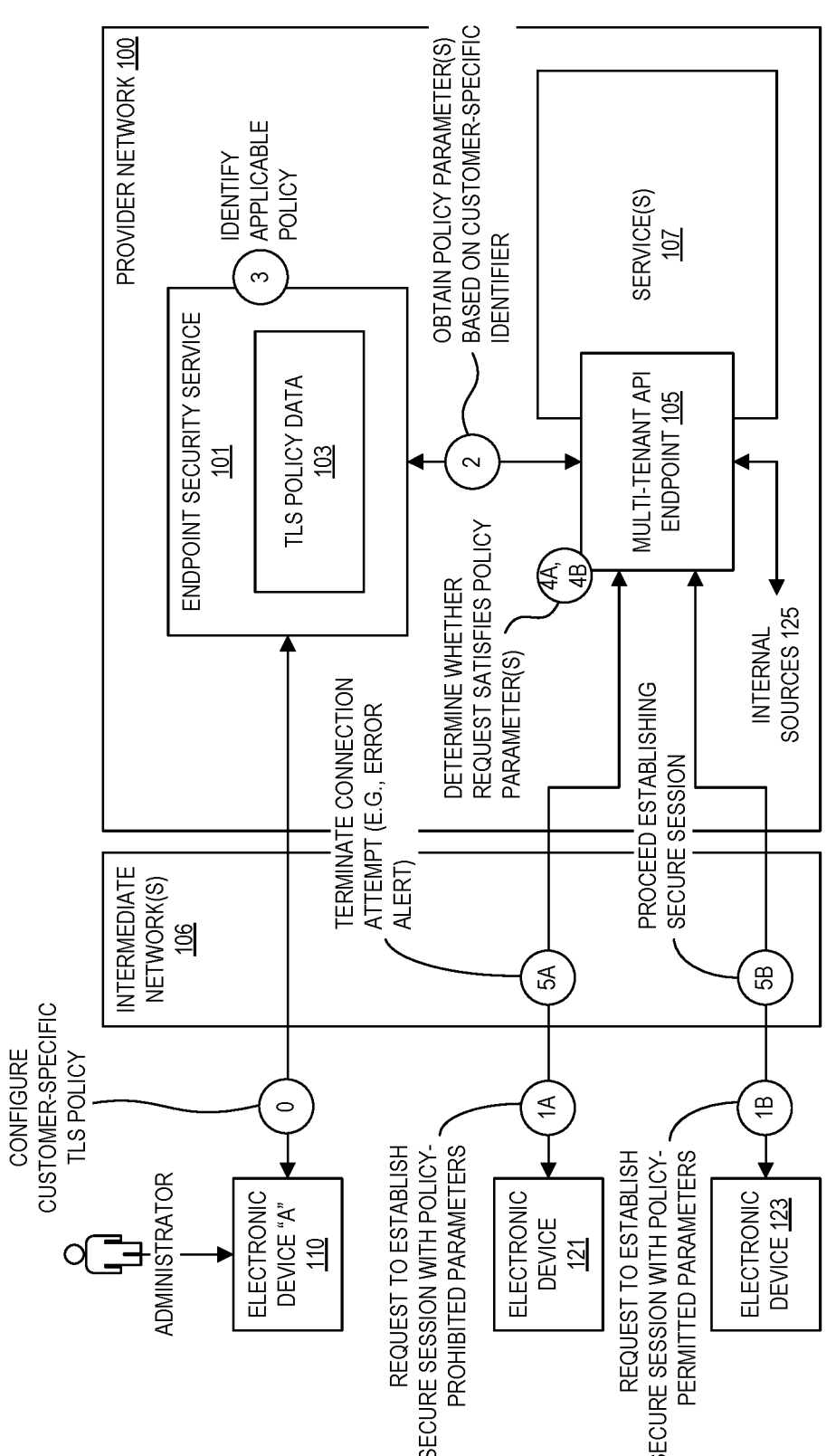
FIG. 1 is a diagram illustrating an environment for per-customer transport layer security (TLS) controls in a multi-tenant provider network according to some examples.

The present disclosure relates to methods, apparatus, systems, and non-transitory computer-readable storage media for per-customer transport layer security (TLS) controls in a multi-tenant provider network. According to some examples, customers define their TLS requirements—typically in the form of a TLS policy—with an endpoint security service of the provider network. An exemplary TLS policy includes permitted TLS protocol versions (e.g., 1.2, 1.3) and permitted cipher suites. Application programming interface (API) endpoints, which typically serve as the interface to multi-tenant (or shared) resources or services of the provider network-enforce the customer-specified TLS requirements as part of establishing TLS-secured communications sessions with the customer's client devices/users. To do so, the API endpoints use customer-identifying metadata included in or with TLS session-establishment requests to obtain the applicable policy or its parameters from the endpoint security service. If the client device initiating the establishment of a session cannot satisfy the customer's TLS requirements, the API endpoint aborts establishing the session. Otherwise, the API endpoint proceeds establishing the session with the client device.

In some examples, the endpoint security service stores customer TLS policies in a database. Such a database can be a SQL or NoSQL database and may itself be hosted by a database service of the provider network, such as Amazon Web Services (AWS) DynamoDB, RedShift, RDS, etc. The database key used to identify the customer TLS policy applicable to a session-establishment request is determined with the customer-identifying metadata included in or with TLS session-establishment requests. A TLS session is then established based on whether the session-establishment request satisfies the applicable TLS policy parameters. In some examples, if an applicable customer TLS policy cannot be identified, a default set of permitted TLS parameters is used for session establishment.

In some examples, per-customer TLS-to-TLS bridge proxies enforce customer TLS requirements upstream of an API endpoint. The customer can configure their TLS requirements with the proxy via the endpoint security service. The proxy enforces those requirements on requests to establish TLS-secured sessions with the proxy. The proxy can then use subsequent traffic (e.g., Hypertext Transfer Protocol (HTTP) messages) to establish a TLS-secured session with and route traffic to the desired API endpoint.

Different customers place competing TLS demands on provider network operators. Customers with difficult-to-update devices (e.g., legacy systems, IP-televisions or other embedded systems) often ask the operator to avoid stricter TLS requirements so that their systems continue to operate. Conversely, customers that exchange sensitive data between their users' devices and cloud-based resources often ask the operator to impose stricter TLS requirements so that out-of-date devices are unable to communicate that sensitive data. While it is theoretically possible for customers in this latter group to enforce their TLS requirements on their end by managing the devices of all of their users, in practice, such enforcement is challenging—customers may not know the identities, locations, devices, etc. of all of their users or have access to those users' devices. Having a central TLS control mechanism at the provider network would prove beneficial for both types of customers. Those wanting to avoid further TLS requirements can operate with the status quo, while those wanting stricter TLS requirements can impose them.

FIG. 1 is a diagram illustrating an environment for per-customer transport layer security (TLS) controls in a multi-tenant provider network according to some examples. A provider network 100 (or "cloud" or "multi-tenant" provider network) provides many different users with the ability to use one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide the above and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/ accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The provider network 100 includes an endpoint security service 101 and a multi-tenant API endpoint 105 (or simply "API endpoint"). The endpoint security service 101 vends an API through which customers can configure their own TLS policies, indicated as TLS policy data 103. The endpoint security service 101 also vends APIs through which API endpoints can access customer TLS policy parameters for use during TLS session-establishment—also referred to as the handshake.

A TLS handshake involves a series of messages between a client and a server. In that message exchange, the client and server agree on the encryption that will be used and exchange a symmetric key used for encryption and decryption of subsequent traffic (e.g., HTTP traffic). With reference to FIG. 1, applications executing on electronic devices 121, 123 can be considered TLS clients, while the API endpoint 105 can be considered a TLS server.

A typical customer-defined TLS policy includes a set of permitted TLS parameters. TLS parameters are typically specified as TLS versions (e.g., TLS 1.0, TLS 1.1, TLS 1.2, TLS 1.3, and so on) and, for each version, a set of cipher suites. Cipher suites typically identify the cryptographic algorithm(s) and algorithm parameters to be used in the handshake process. Cipher suites may be encoded as text strings or as binary values, such as defined by standard (see, e.g., Appendix A.5 of RFC 5246). An example policy follows:

| Example Policy 12345 | |
| --- | --- |
| TLS Version | Cipher Suite(s) |
| TLS 1.2 | {TLS_RSA_WITH_AES_128_CBC_SHA, TLS_RSA_WITH_AES_256_CBC_SHA, TLS_RSA_WITH_AES_128_CBC_SHA256, TLS_RSA_WITH_AES_256_CBC_SHA256} |
| TLS 1.3 | {TLS_AES_128_CCM_SHA256, TLS_AES_128_CCM_8_SHA256} |

In some examples, the particulars of a TLS policy (e.g., versions and cipher suites) can be identified in higher-level groupings to reduce the complexity of specifying permitted TLS-parameters. For example, TLS parameters (e.g., versions/cipher suites) can be grouped together based on their relative security strength-some parameters can be grouped together as "strong" security, other parameters can be grouped together as "medium" security, and still other TLS parameters can be grouped together as "weak" security. A customer specifying a "weak" policy would allow for the grouped weak, medium, and strong parameters, whereas a customer specifying a "medium" policy would allow for the grouped medium and strong parameters, but not the weak parameters. As another example, TLS parameters can be grouped together based on their compliance with certain information processing, data security, and/or data privacy standards such as Federal Risk and Authorization Management Program (FedRAMP), Payment Card Industry (PCI) standards, Federal Information Processing Standards (FIPS), etc. For example, when a customer specifies a PCI-compliant policy, the endpoint security service would translate that into a permitted set of TLS versions/cipher suites. Note that this added layer of abstraction between a standard and the allowed TLS versions/cipher suites allows the endpoint security service to change the permitted versions/cipher suites to stay up to date with changing standards and without requiring the customer to make the changes.

API endpoints, such as the API endpoint 105, vend API interface(s) through which applications can access services 107 of the cloud provider network (e.g., AWS EC2, S3, DynamoDB, etc.). Exemplary applications (which may also be referred to as requestors) can include command-line interfaces, web browsers, database clients, mobile applications, etc. Requests can originate from outside of the provider network 100 (e.g., from electronic devices 110, 121, 123 via intermediate network(s) 106) or within the provider network (e.g., from other internal sources 125). API endpoints as contemplated herein include TLS support to act as a TLS endpoint for securing communications with these requestors. In some examples, the API endpoints use information received in the TLS handshake messaging as an indication or identifier of a customer from which the customer's TLS policy/policies can be identified.

In some examples, API endpoints may have a one-to-one relationship with their fronted service or resource; in other examples, API endpoints may have a one-to-many relationship with fronted services or resources. A single API endpoint can be implemented as a fleet of load-balanced instances across which API requests are distributed.

The endpoint security service 101 typically stores TLS policy data 103 in a database. In some examples, the database is managed by a managed storage or database service of the provider network (e.g., AWS DynamoDB, RedShift, RDS, etc.). Storing TLS policies in a database or other low-latency storage backing supports the many API endpoints that can and often do exist within a provider network, particularly when each API endpoint may be handling many concurrent TLS handshaking operations.

An example database record stores a customer's policy under a key. An example database record follows.

| Example Database Entry | |
| --- | --- |
| Key | Policy |
| Key | Policy 12345 |

The endpoint security service 101 stores customer policies under keys that API endpoints can determine based on information (sometimes referred to as metadata) included in a packet received from a client during the TLS handshaking process. For example, the information to determine a database key may be part of the Internet Protocol (IP), Transmission Control Protocol (TCP), and/or TLS portions of a packet exchanged during TLS handshaking—that is, a TLS packet in a TCP packet in an IP packet.

In some examples, customers can create TLS policies having different applicability with the endpoint security service 101. For example, a customer may specify a general TLS policy applicable to all of its users and additional, service-or resource-specific TLS policies applicable to certain services or resources (typically with the specific TLS policies including a subset of the permitted TLS parameters).

An endpoint security service, such as the endpoint security service 101, can be implemented as a software program executing on compute resources (e.g., computer systems or other electronic devices) of the provider network. Similarly, API endpoints, such as API endpoint 105, can be implemented as a software program executing on compute resources of the provider network. The compute resources can be provided by a managed compute service of the provider network (not shown), such as those described above, or by other control plane systems.

Various operations of the example system illustrated in FIG. 1 are now described with reference to the circled numbers 0 through 5. Users having sufficient privileges to manage TLS policies (e.g., IT personnel) can issue requests to the endpoint security service 101 to configure TLS policies (e.g., create, update, delete). At circle '0' of FIG. 1, the endpoint security service 101 receives a request to create a TLS policy for a customer. The request typically identifies permitted TLS parameters (e.g., versions and cipher suites).

In some examples, the request can identify the permitted TLS versions and cipher suites explicitly. Such parameters may be ordered such that an API endpoint will attempt to establish TLS sessions with the most preferred version/ cipher suite as agreed upon between a client and server (if one exists). In other examples, the request can identify the permitted TLS versions and cipher suites using an identifier associated with a group of TLS parameters. For example, the request can specify "strong," "medium," or "weak" to identify the permitted TLS parameters. As another example, the request can specify one or more data processing standards to identify the permitted TLS parameters.

The endpoint security service 101 creates the TLS policy having the customer-identified TLS parameters and stores it in the TLS policy data 103. For example, the endpoint security service 101 can store the created TLS policy in a database under a database key that can be subsequently determined by an API endpoint based on information included in a packet received from a client during the TLS handshaking process.

Circles '1A' through '5A' illustrate an example failed TLS negotiation due to a customer TLS policy. At circle '1A' of FIG. 1, a TLS client application executing on an electronic device 121 initiates TLS session establishment by submitting a request to establish a TLS session to the API endpoint 105. Such a request can be the "Client Hello" message. The Client Hello message includes a set of client-supported TLS parameters (e.g., supported versions and cipher suites). For purposes of the illustrated example, the message indicates supported TLS versions 1.0 and 1.1 (supported cipher suites can also be included but are unnecessary to illustrate this example).

At circle '2' of FIG. 1, the API endpoint 105 obtains policy parameters from the endpoint security service 101 based on some customer-specific identifier (also referred to as an "indication of a customer"). In particular, the API endpoint 105 uses metadata received as part of the TLS handshake messaging to determine an identifier of the applicable customer TLS policy, if one exists. For example, the API endpoint 105 can determine the identifier by extracting data from field(s) included in received packets. The API endpoint 105 can then obtain (e.g., by issuing an API request) the policy or policy parameters associated with the customer-specific identifier from the endpoint security service 101. In database-based TLS policy data 103, the customer-specific identifier can be a database key.

At circle '3' of FIG. 1, the endpoint security service 101 uses the identifier to identify the applicable customer TLS policy, if any. Note that the identifier/database key can directly or indirectly identify the applicable TLS policy. As an example of indirect identification, if the endpoint security service 101 stores TLS policies under a customer identifier database key and the TLS handshaking included a customer-managed source IP address, the API endpoint 105 would request the TLS policy or policy parameters associated with the source IP address from the endpoint security service 101. The endpoint security service 101 can then determine the customer identifier database key from the source IP address (e.g., using another database lookup) to identify the applicable customer TLS policy in the database, if any, and return the policy or policy parameters identified by that database key to the API endpoint 105.

As an example of direct identification, the endpoint security service 101 stores TLS policies under a customer-specific domain name database key and the TLS handshaking included the customer-specific domain name key, the API endpoint 105 would request the TLS policy or policy parameters associated with the customer-specific domain name from the endpoint security service 101. The endpoint security service 101 can then use the customer-specific domain name to identify the applicable customer TLS policy in the database, if any, and return the policy or policy parameters identified by that database key to the API endpoint 105. For purposes of the illustrated example, assume the endpoint security service 101 identifies an applicable customer TLS policy indicating that TLS versions 1.2 and 1.3 are permitted (again, cipher suites may be specified but are unnecessary for this example).

In some examples, if the endpoint security service 101 is unable to locate a customer TLS policy associated with the identifier, the endpoint security service 101 can return a default TLS policy or default set of permitted TLS parameters to the API endpoint 105. The default TLS parameters can be permissive in scope (e.g., supporting all non-deprecated TLS versions and cipher suites). In other examples, the API endpoints may store the default set of TLS parameters. The endpoint security service 101 can return to the API endpoint 105 an indication that no customer TLS policy exists, in which case the API endpoint 105 can use the stored default set of TLS parameters.

At circle '4A' of FIG. 1, the API endpoint 105 determines whether the requested TLS parameters received at circle '1A' satisfies the permitted TLS parameters obtained from the endpoint security service 101. In this example, the API endpoint 105 would determine that there are no matches between the policy-permitted TLS versions 1.2 and 1.3 and the client-supported TLS versions 1.0 and 1.1 (a similar evaluation would occur for permitted and supported cipher suites, not shown). Consequently, at circle '5A' of FIG. 1, the API endpoint 105 would terminate the connection with the client, typically sending a fatal error alert (e.g., a "handshake_failure," a "protocol_version," or a "insufficient_security" error alert).

Circles '1B' through '5B' illustrate an example successful TLS negotiation using to a customer TLS policy. At circle '1B' of FIG. 1, a TLS client application executing on an electronic device 123 initiates TLS session establishment by submitting a request to establish a TLS session to the API endpoint 105—e.g., the "Client Hello" message. For the purposes of the illustrated example, the message indicates supported TLS version 1.2 and cipher suite TLS_RSA_WITH_AES_128_CBC_SHA.

At circles '2' and '3' of FIG. 1, the API endpoint 105 and endpoint security service 101 operate as described above. The API endpoint 105 obtains the permitted TLS parameters from the applicable customer TLS policy. Assuming the metadata received in the TLS handshake messaging at circle '1B' includes the same identifier as in TLS negotiations with electronic device 121, the applicable customer TLS policy would include permitted TLS versions 1.2 and 1.3 and, for version 1.2, the permitted cipher suite TLS_RSA_WITH_AES_128_CBC_SHA.

At circle '4B' of FIG. 1, the API endpoint 105 determines whether the requested TLS parameters received at circle '1B' satisfies the permitted TLS parameters obtained from the endpoint security service 101. In this example, the API endpoint 105 would determine that is a match between the policy-permitted TLS versions 1.2 and the client-supported TLS versions 1.2 and between the policy-permitted cipher suite TLS_RSA_WITH_AES_128_CBC_SHA and the client-supported cipher suite TLS_RSA_WITH_AES_128_CBC_SHA. Consequently, at circle '5B' of FIG. 1, the API endpoint 105 would proceed with the establishment of the TLS session (e.g., by sending a Server Hello message).

In some examples, a customer TLS policy can include the set of permitted TLS versions and permitted cipher suites in preferred order. During TLS handshaking, assuming multiple potential matches between the client-supported TLS parameters and policy-permitted TLS parameters, the API endpoint can select the preferred matching version and, for that version, the preferred matching cipher suite.

In some examples, enforcement of a customer-defined TLS policy may occur after a TLS session has been established with the service 107. Such may be the case where the API endpoint 105 was unable to obtain a customer's existing TLS policy and instead relied on the default set of permitted TLS parameters (e.g., due to lack of information in packets received during TLS handshaking). Once a TLS session has been established, the requestor can proceed with application-level communications with the service 107. Initial application-level communications typically include authentication information to authenticate the service-level API requests, such as by providing the service 107 with an indication of identity (e.g., a Sigv4 access key, a bearer token, etc.). The service 107 can use the now-explicitly identified identity to identify the associated customer TLS policy and to determine whether the established TLS session meets the customer's TLS requirements. If not, the service 107 can terminate the communications with the client.

FIGS. 2 through 5 illustrate various examples through which information or metadata included in a packet received from a client during the TLS handshaking process can be used to identify customer-specific TLS policies. Note that in each of these examples, the customer also specifies a TLS policy such as described in relation to circle '0' of FIG. 1.

Figure 2:
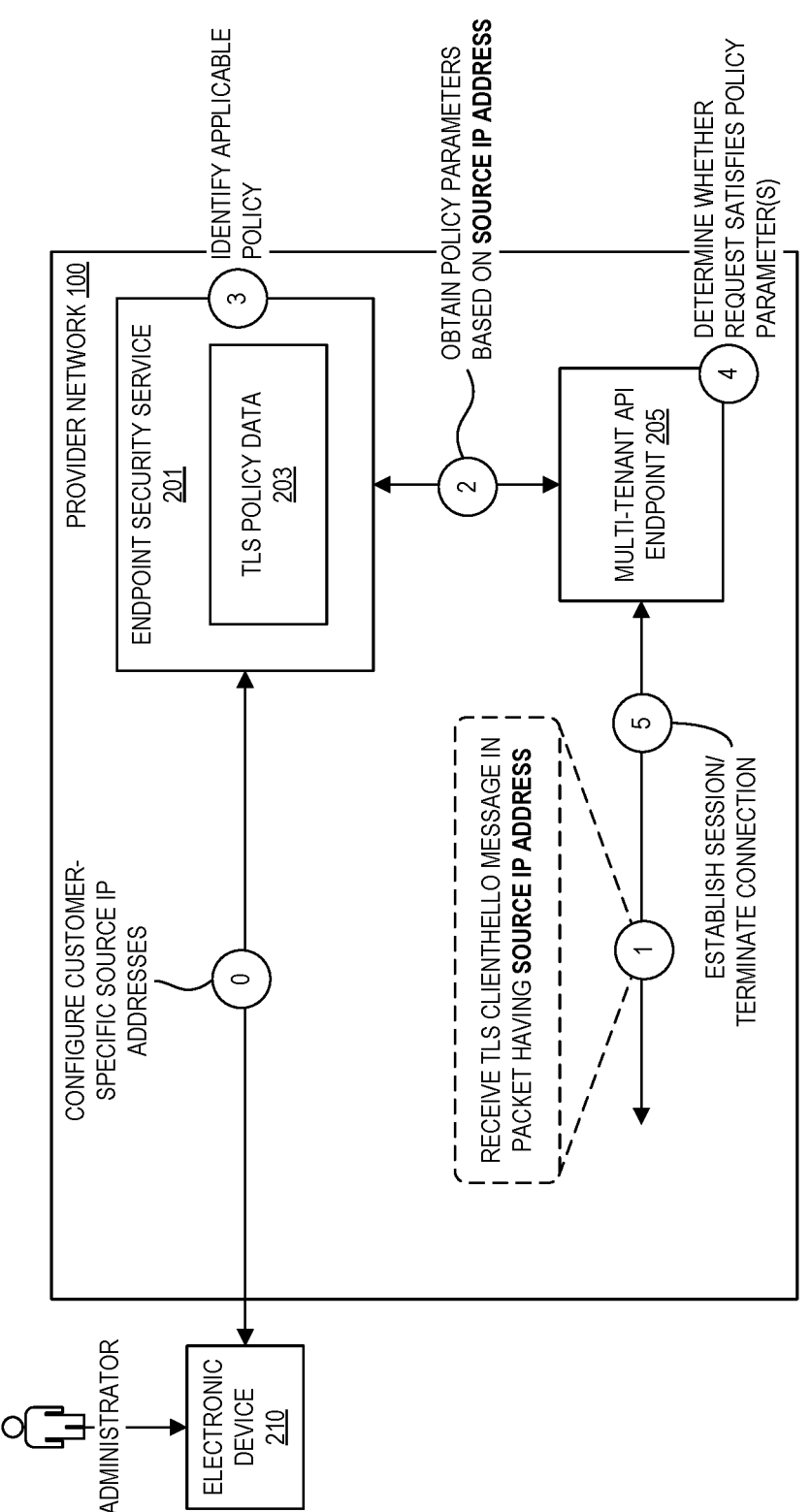
FIG. 2 is a diagram illustrating an environment using Internet Protocol (IP) source address information to provide customer-specific transport layer security controls according to some examples.

FIG. 2 is a diagram illustrating an environment using IP source address information to provide customer-specific transport layer security controls according to some examples. In some cases, a customer may know the set of potential API endpoint request sources. For example, some customers may route user traffic destined for external networks through a corporate network having a set of known egress points (e.g., firewalls, gateways, etc.). As another example, some customers may expect API endpoint requests to originate from within virtual networks having known network address ranges hosted by the provider network. In such cases, the source IP address of packets received at an API endpoint can be used as a customer-specific identifier to identify the customer's TLS policy.

Various operations of the example system illustrated in FIG. 2 are now described with reference to the circled numbers 0 through 5. At circle '0' of FIG. 2, the endpoint security service 201 receives a request to configure customer-specific source IP addresses. Such a request can be part of the request to configure the TLS policy 203. The source IP address prefixes can be specified as individual addresses or as blocks (e.g., a CIDR/28 block of addresses). Provided customer client traffic originates from a specified address or prefix, the endpoint security service 201 can use the source IP address of a TLS handshake request to identify the applicable customer TLS policy.

At circle '1' of FIG. 2, the multi-tenant API endpoint 205 receives a request to establish a TLS session. In TLS-parlance, this request is commonly referred to as the Client Hello message. The Client Hello message includes supported TLS parameters (e.g., TLS versions and cipher suites) and arrives in a packet having a source IP address that will serve as a customer-specific identifier.

At circle '2' of FIG. 2, the multi-tenant API endpoint 205 uses the customer-specific identifier to obtain the permitted policy parameters from the endpoint security service 201. For example, the multi-tenant API endpoint 205 can issue an API request to the endpoint security service 201 for the permitted policy parameters, the API request including the customer-specific identifier—in this case, the source IP address of the packet containing the Client Hello message.

At circle '3' of FIG. 2, the endpoint security service 201 uses the customer-specific identifier to identify the applicable TLS policy in the TLS policy data 203. The endpoint security service 201 can return the permitted TLS policy parameters to the source of the request-here the multi-tenant endpoint 205. A key or index into the TLS policy data 203 is based at least in part on the customer-specific identifier. For example, the TLS policy data 203 can be stored in a database table indexed by IP address prefixes. Thus, if a policy is associated with the prefix 205.120.10.0/28, a source IP address of 205.120.10.5 would match a database entry storing that policy. Once the endpoint security service 201 has identified the applicable TLS policy, the endpoint security service 201 can return the permitted TLS parameters to the multi-tenant API endpoint 205. In some examples, the endpoint security service 201 returns the permitted TLS parameters as part of the applicable TLS policy. In other examples, the endpoint security service 201 returns the TLS parameters specified extracted from the applicable TLS policy. Note that if no applicable customer-specific TLS policy can be found, the endpoint security service 201 can return a default set of permitted TLS parameters or an indication that the multi-tenant endpoint 205 should use a default set of permitted TLS parameters.

At circle '4' of FIG. 2, the multi-tenant API endpoint 205 evaluates the permitted TLS parameters obtained from the endpoint security service 201 against the supported TLS parameters included in the Client Hello message to determine whether the endpoint can support the request (e.g., whether a client-supported TLS version and cipher suite is included in policy-permitted TLS version(s) and cipher suite(s)). Based on that determination, the multi-tenant API endpoint 205 will either proceed with the TLS handshake (e.g., by responding with a Server Hello message) and establish the TLS session or terminate the connection (e.g., by responding with an Error Alert), as indicated at circle '5' of FIG. 2.

Figure 3:
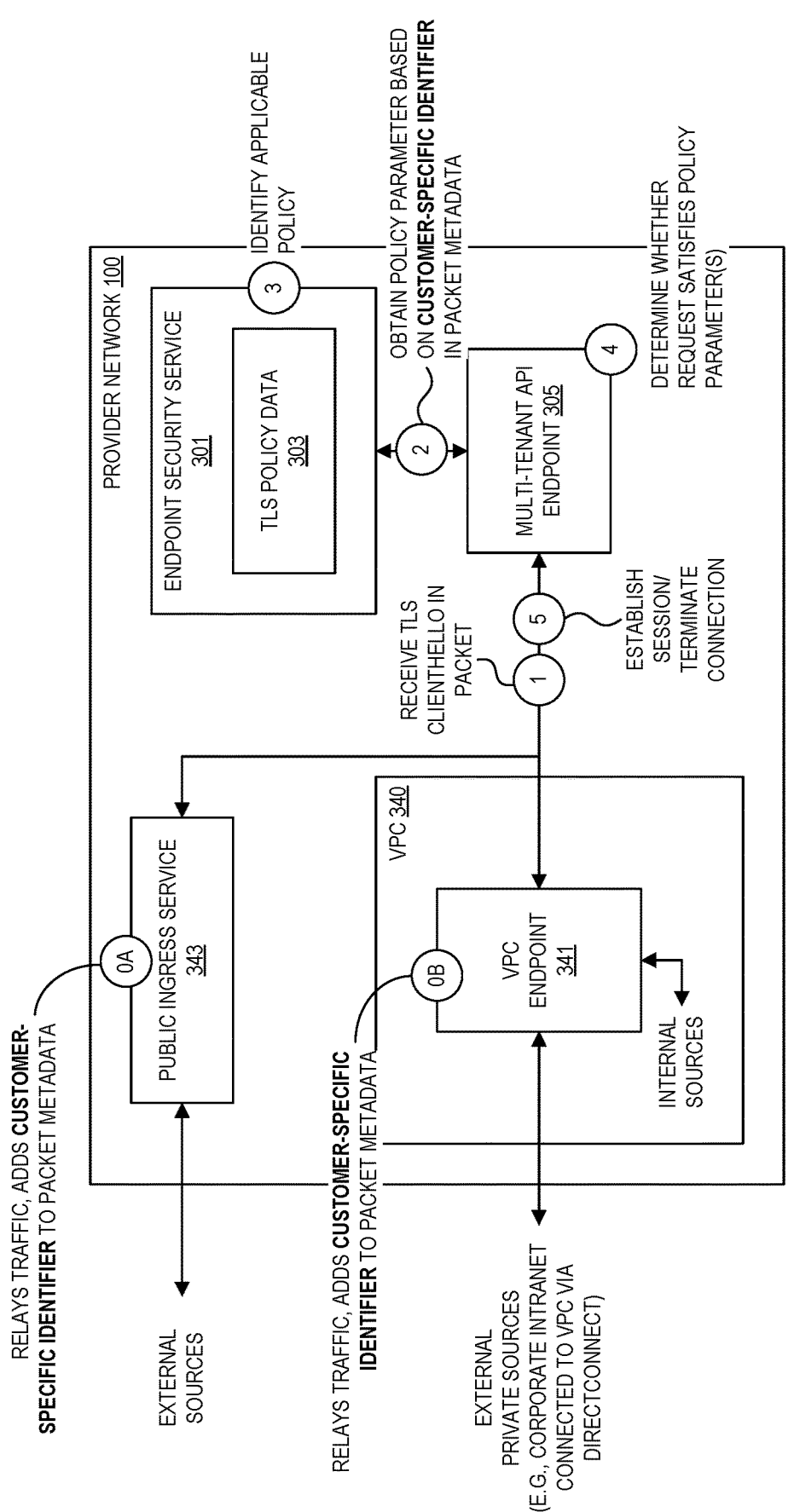
FIG. 3 is a diagram illustrating an environment using embedded metadata in IP or Transmission Control Protocol (TCP) headers to provide customer-specific transport layer security controls according to some examples.

FIG. 3 is a diagram illustrating an environment using embedded metadata in IP or TCP headers to provide customer-specific transport layer security controls according to some examples. In some cases, various networking components or services of the provider network 100 may embed customer-specific identifiers in packet metadata of traffic routed through them (sometimes referred to as "decorating" the packet). For example, AWS Global Accelerator (AGA) provides static IP addresses to customers that provide a global ingress point that automatically routes inbound traffic to the nearest region. Since the ingress IP address is customer-specific, AGA can embed a customer-specific identifier into inbound traffic before sending it further into the provider network. As another example, virtual networks such as VPCs may embed their own unique identifier in traffic exiting one of their virtual network interfaces. Since virtual networks are owned by particular customers, the VPC can embed a customer-specific identifier into outbound traffic leaving the VPC. The PROXY Protocol is one technique of embedding customer-specific identifiers in packets. By routing API endpoint directed traffic through one of these networking components or services, the embedded metadata can be used as an indication of the customer to identify the customer's TLS policy.

Various operations of the example system illustrated in FIG. 3 are now described with reference to the circled numbers 0 through 5. As indicated above, networking components or services of the provider network 100 can embed a customer-specific identifier in a packet destined to a multi-tenant API endpoint. The customer-specific identifier is often embedded in an IP or TCP header portion of the packet but can also be embedded in another portion of the IP packet or payload. For example, at circle '0A' of FIG. 3, a public ingress service 353, such as AGA, embeds a customer-specific identifier to packet metadata of packets received at the ingress service 343 before routing those packets further into the provider network 100. Exemplary customer-specific identifiers include a customer identifier (e.g., an account) or the static IP address assigned to the customer at the ingress point. As another example, at circle '0B' of FIG. 3, a VPC endpoint 341 (e.g., a gateway, a virtual network interface, etc.) of a VPC 340 embeds a customer-specific identifier to packet metadata of packets exiting the VPC. These packets traversing the VPC 340 may originate from internal sources within the VPC 340 or from external sources that can send traffic to the VPC 340.

At circle '1' of FIG. 3, the multi-tenant API endpoint 305 receives a request to establish a TLS session, again typically referred to as the Client Hello message. The Client Hello message includes supported TLS parameters (e.g., TLS versions and cipher suites) and arrives in a packet having a customer-specific identifier embedded in the packet including the Client Hello message by, for example, the VPC endpoint 341 or the public ingress service 343.

At circle '2' of FIG. 3, the multi-tenant API endpoint 305 uses the customer-specific identifier to obtain the permitted policy parameters from the endpoint security service 301. For example, the multi-tenant API endpoint 305 can issue an API request to the endpoint security service 301 for the permitted policy parameters, the API request including the customer-specific identifier embedded in the packet including the Client Hello message by, for example, the VPC endpoint 341 or the public ingress service 343.

At circle '3' of FIG. 3, the endpoint security service 301 uses the customer-specific identifier to identify the applicable TLS policy in the TLS policy data 303 and to return the permitted TLS parameters to the source of the request. Again, a key or index into the TLS policy data 303 is based at least in part on the customer-specific identifier. Once the endpoint security service 301 has identified the applicable TLS policy, the endpoint security service 301 can return the permitted TLS parameters to the multi-tenant API endpoint 305. Again, if no customer-specific TLS policy can be found, a default set of permitted TLS parameters can be used for subsequent session establishment.

At circle '4' of FIG. 3, the multi-tenant API endpoint 305 evaluates the permitted TLS parameters obtained from the endpoint security service 301 against the supported TLS parameters included in the Client Hello message to determine whether the endpoint can support the request (e.g., whether a client-supported TLS version and cipher suite is included in policy-permitted TLS version(s) and cipher suite(s)). Based on that determination, the multi-tenant API endpoint 305 will either proceed with the TLS handshake (e.g., by responding with a Server Hello message) and establish the TLS session or terminate the connection (e.g., by responding with an Error Alert), as indicated at circle '5' of FIG. 3.

Figure 4:
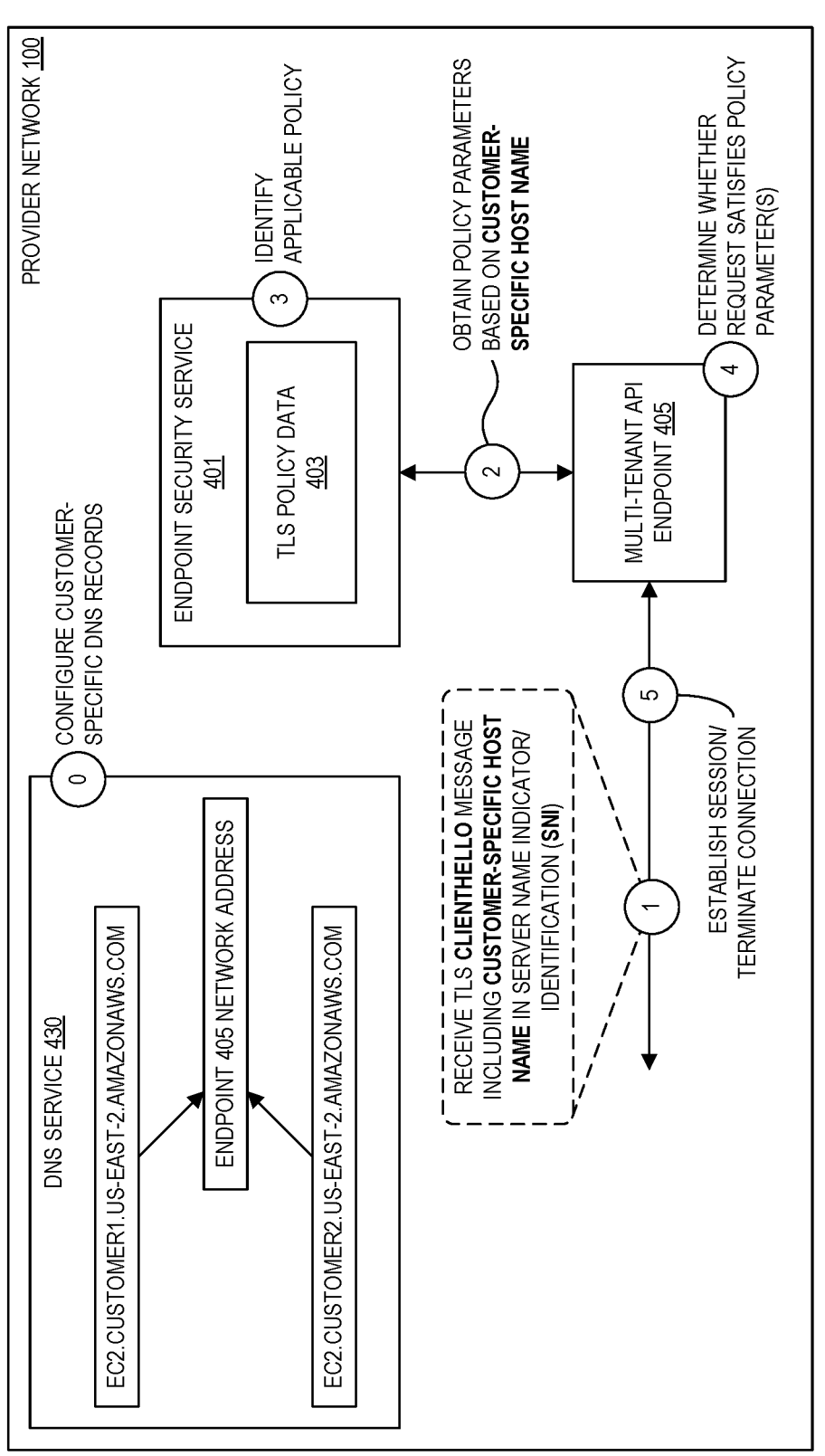
FIG. 4 is a diagram illustrating an environment using TLS server name indication (SNI) information to provide customer-specific transport layer security controls according to some examples.

FIG. 4 is a diagram illustrating an environment using TLS server name indication (SNI) information to provide customer-specific transport layer security controls according to some examples. Inbound TLS handshaking requests (e.g., the client hello message) can include an SNI field that indicates the host name of the host with which secure communications are being established. Leveraging the Domain Name System (DNS), the SNI field can be used to embed a customer-specific identifier in the form of customer-specific DNS names. The customer-specific domain names can be used to identify the customer's TLS policy.

Various operations of the example system illustrated in FIG. 4 are now described with reference to the circled numbers 1 through 5. At circle '0' of FIG. 4, a DNS service 430 of the provider network 100 is updated with a record to associate a customer-specific domain name with a multi-tenant API endpoint serving to provide TLS controls to a service of the provider network. The update can occur when a customer configures their TLS policy with an endpoint security service, such as described above. For example, the endpoint security service 401 can initiate the creation of the new domain name for the customer with the DNS service 430. The endpoint security service 401 can then store the customer's TLS policy under that domain name in TLS policy data 403. As illustrated, two exemplary customer-specific domain names resolve to the multi-tenant API endpoint 405.

At circle '1' of FIG. 4, the multi-tenant API endpoint 405 receives a request to establish a TLS session, again typically referred to as the Client Hello message. The Client Hello message includes supported TLS parameters (e.g., TLS versions and cipher suites) and a Server Name Indication (SNI) field that includes a customer-specific identifier-here the customer-specific domain name configured at circle '0.'

At circle '2' of FIG. 4, the multi-tenant API endpoint 405 uses the customer-specific identifier to obtain the permitted policy parameters from the endpoint security service 401. For example, the multi-tenant API endpoint 405 can issue an API request to the endpoint security service 401 for the permitted policy parameters, the API request including the customer-specific identifier—in this case, the value in the SNI field of the Client Hello message.

At circle '3' of FIG. 4, the endpoint security service 401 uses the customer-specific identifier to identify the applicable TLS policy in the TLS policy data 403 and to return the permitted TLS parameters to the source of the request. Again, a key or index into the TLS policy data 403 is based at least in part on the customer-specific identifier. For example, the TLS policy data 403 can be stored in a database table indexed by customer-specific domain names. Thus, if a policy is associated with the domain name ec2.customer 1.us-east-2.amazonaws.com, that domain name (or a portion thereof, such as "customer1") can be used to identify the associated customer TLS policy. Once the endpoint security service 401 has identified the applicable TLS policy, the endpoint security service 401 can return the permitted TLS parameters to the multi-tenant API endpoint 405. Again, if no customer-specific TLS policy can be found, a default set of permitted TLS parameters can be used for subsequent session establishment.

At circle '4' of FIG. 4, the multi-tenant API endpoint 405 evaluates the permitted TLS parameters obtained from the endpoint security service 401 against the supported TLS parameters included in the Client Hello message to determine whether the endpoint can support the request (e.g., whether a client-supported TLS version and cipher suite is included in policy-permitted TLS version(s) and cipher suite(s)). Based on that determination, the multi-tenant API endpoint 405 will either proceed with the TLS handshake (e.g., by responding with a Server Hello message) and establish the TLS session or terminate the connection (e.g., by responding with an Error Alert), as indicated at circle '5' of FIG. 4.

Figure 5:
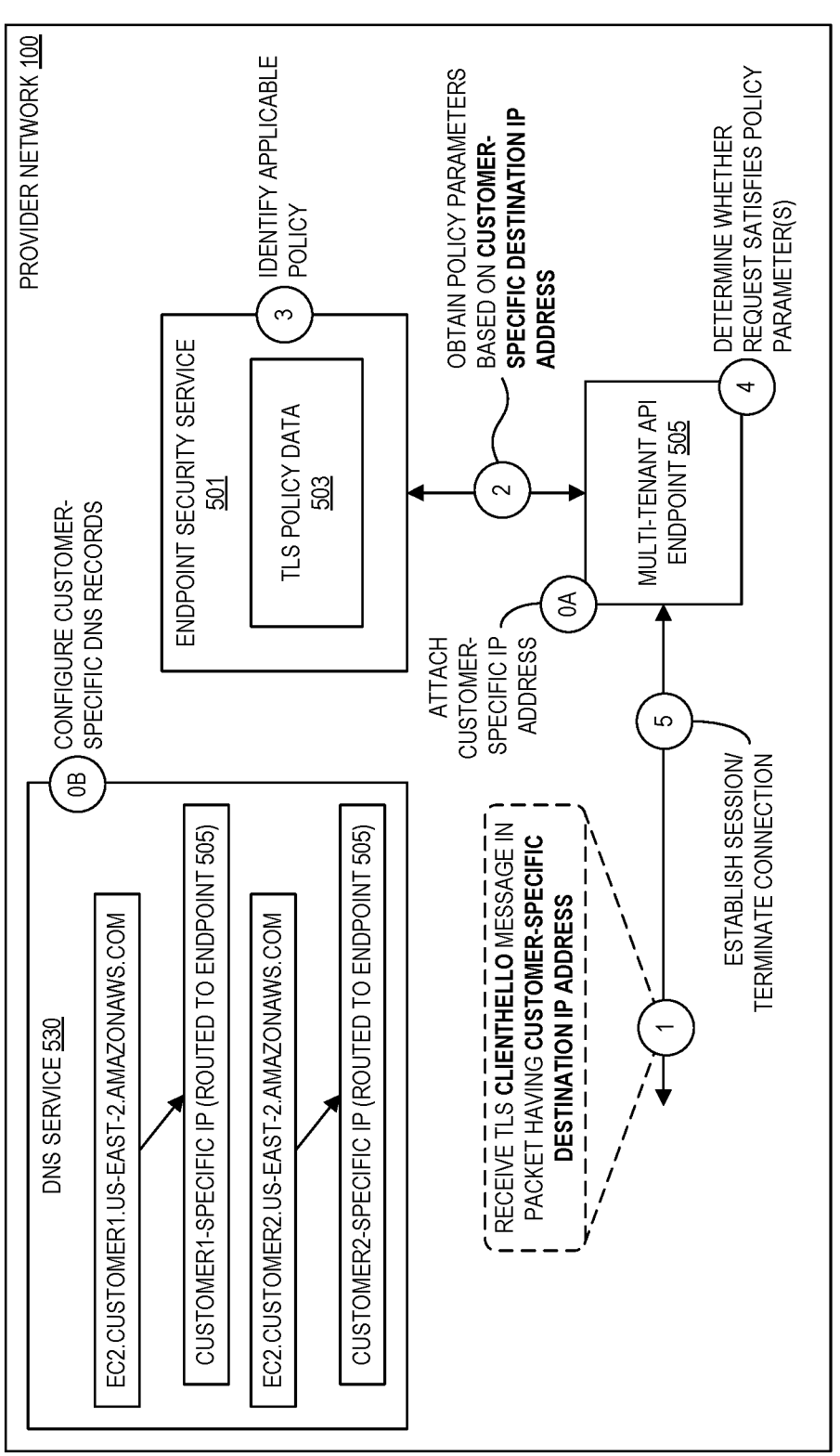
FIG. 5 is a diagram illustrating an environment using IP destination address information to provide customer-specific transport layer security controls according to some examples.

FIG. 5 is a diagram illustrating an environment using IP destination address information to provide customer-specific transport layer security controls according to some examples. The size of the IPV6 address space allows for the allocation of unique IP addresses for a given service to different customers. In some examples, the provider network 100 can assign a unique IP address to each (customer, service) or (customer, region, service) tuple. The provider network 100 can then route each of those addresses destined for the API endpoint of a particular service to a single API endpoint (or load balanced fleet of endpoints). Customers can then submit requests to their own unique IP address (or a customer-specific DNS name that resolves to the customer-specific IP address) that serves as a customer-specific identifier. The customer-specific service IP addresses can be used to identify the customer's TLS policy.

Various operations of the example system illustrated in FIG. 5 are now described with reference to the circled numbers 1 through 5. At circle '0A' of FIG. 5, a new customer-specific IP address is assigned to a multi-tenant API endpoint serving to provide TLS controls to a service of the provider network. The assignment can occur when a customer configures their TLS policy with an endpoint security service, such as described above. For example, the endpoint security service 501 can cause a control plane service (not shown) to assign and attach a new IP address for the customer to the multi-tenant API endpoint 505. The endpoint security service 501 can then store the customer's TLS policy under that IP address in TLS policy data 503. At circle '0B' of FIG. 5, a DNS service 530 of the provider network 100 can be updated with a record to associate a customer-specific domain name with the customer-specific IP address that routes to the multi-tenant API endpoint. As illustrated, two exemplary customer-specific domain names resolve to two different customer-specific service IP addresses that route to the multi-tenant API endpoint 505. Note that domain name is optional here as the customer-specific service IP addresses serve as customer-specific identifiers. Clients can route packets to a multi-tenant API endpoint either directly with the assigned IP address or via resolution with the domain name.

At circle '1' of FIG. 5, the multi-tenant API endpoint 505 receives a request to establish a TLS session, again typically referred to as the Client Hello message. The Client Hello message includes supported TLS parameters (e.g., TLS versions and cipher suites) and arrives in a packet having a destination IP address that will serve as a customer-specific identifier.

At circle '2' of FIG. 5, the multi-tenant API endpoint 505 uses the customer-specific identifier to obtain the permitted policy parameters from the endpoint security service 501. For example, the multi-tenant API endpoint 505 can issue an API request to the endpoint security service 501 for the permitted policy parameters, the API request including the customer-specific identifier—in this case, the destination IP address of the packet containing the Client Hello message.

At circle '3' of FIG. 5, the endpoint security service 501 uses the customer-specific identifier to identify the applicable TLS policy in the TLS policy data 503 and to return the permitted TLS parameters to the source of the request. Again, a key or index into the TLS policy data 403 is based at least in part on the customer-specific identifier. For example, the TLS policy data 403 can be stored in a database table indexed by customer-specific service IP addresses. Thus, if a customer has been assigned the IP address 2001:0db8:85a3:0000:0000:8a2e: 0370:f000 for a service, that IP address can be used to identify the associated customer TLS policy. Once the endpoint security service 501 has identified the applicable TLS policy, the endpoint security service 501 can return the permitted TLS parameters to the multi-tenant API endpoint 505. Again, if no customer-specific TLS policy can be found, a default set of permitted TLS parameters can be used for subsequent session establishment.

At circle '4' of FIG. 5, the multi-tenant API endpoint 505 evaluates the permitted TLS parameters obtained from the endpoint security service 501 against the supported TLS parameters included in the Client Hello message to determine whether the endpoint can support the request (e.g., whether a client-supported TLS version and cipher suite is included in policy-permitted TLS version(s) and cipher suite(s)). Based on that determination, the multi-tenant API endpoint 505 will either proceed with the TLS handshake (e.g., by responding with a Server Hello message) and establish the TLS session or terminate the connection (e.g., by responding with an Error Alert), as indicated at circle '5' of FIG. 5.

Figure 6:
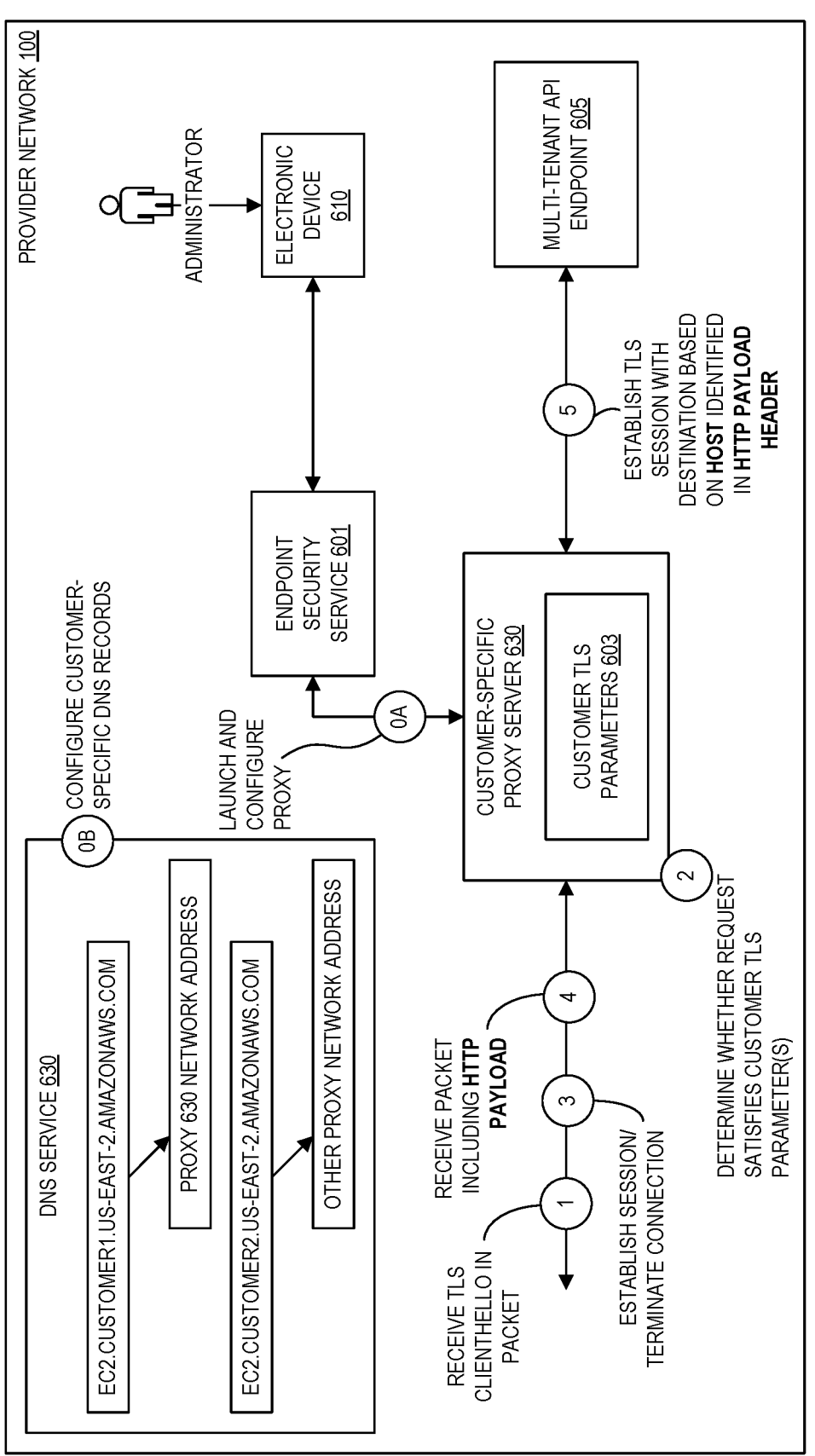
FIG. 6 is a diagram illustrating an environment using customer-specific TLS proxy bridges to provide customer-specific TLS controls according to some examples.

FIG. 6 is a diagram illustrating an environment using customer-specific TLS proxy servers to provide customer-specific TLS controls according to some examples. A TLS proxy server bridges connections between clients (e.g., requesting devices) and provider network services by establishing separate TLS sessions between the client and the bridge and between the bridge and the service. Since different bridges handle traffic for different customers, the customer-specific TLS policy parameters can be stored in a database (e.g., by the endpoint security service) or can also be stored locally at the proxy server.

Various operations of the example system illustrated in FIG. 6 are now described with reference to the circled numbers 1 through 5. At circle '0A' of FIG. 6, the endpoint security service 601 launches and configures a customer-specific proxy server to provide TLS controls in the path to a multi-tenant API endpoint 605 of a service of the provider network. Customer-specific proxy servers, such as the customer-specific proxy server 630, can be implemented as a software program executing on compute resources of the provider network. The launch and configuration can occur when a customer configures their TLS policy with an endpoint security service, such as described above. For example, the endpoint security service 601 can cause a control plane service, such as a managed compute service, to launch an instance to serve as the customer-specific proxy server. As part of or after launching the customer-specific proxy server, the endpoint security service can assign a customer-specific IP address to the proxy server and load the proxy server with the permitted TLS parameters 603 as configured by the customer.

At circle '0B' of FIG. 6, a DNS service 630 of the provider network 100 can be updated with a record to associate a customer-specific domain name with the customer-specific IP address that routes to the customer-specific proxy server. As illustrated, one exemplary customer-specific domain name resolves to the IP address assigned to the proxy server 630 and a different customer-specific domain name resolves to a different IP address of another proxy server (not shown). Note that domain name is optional here as the customer-specific proxy IP addresses serve as customer-specific identifiers. Clients can route packets to a proxy server either with the assigned IP address or via resolution with the domain name.

At circle '1' of FIG. 6, the customer-specific proxy server 630 receives a request to establish a TLS session, again typically referred to as the Client Hello message. The Client Hello message includes supported TLS parameters (e.g., TLS versions and cipher suites).

At circle '2' of FIG. 6, the customer-specific proxy server 630 can evaluate the permitted TLS parameters 603 against the supported TLS parameters included in the Client Hello message to determine whether the endpoint can support the request (e.g., whether a client-supported TLS version and cipher suite is included in policy-permitted TLS version(s) and cipher suite(s)). Based on that determination, the customer-specific proxy server 630 will either proceed with the TLS handshake (e.g., by responding with a Server Hello message) and establish the TLS session or terminate the connection (e.g., by responding with an Error Alert), as indicated at circle '3' of FIG. 5. Note that in other examples, the customer-specific proxy servers may not store a local copy of the permitted TLS parameters and instead obtain them from the endpoint security service such as described in the examples of FIGS. 1-5.

Assuming a TLS session is established, at circle '4' of FIG. 6, the customer-specific proxy server 630 receives a message including a payload including an identification of the service the client is attempting to connect to. For example, the packet can include an HTTP message with an HTTP header having a host field containing the customer-specific domain name. If the packet includes an HTTP host field identifying ec2.customer 1.us-east-2.amazonaws.com, the proxy server 630 can identify the service being accessed based on a lookup of that customer-specific domain name or by removing a specified portion of the domain name that is specific to the customer (e.g., deriving ec2.us-east-2.amazonaws.com from ec2.customer 1.us-east-2.amazonaws.com). With the service identified, the customer-specific proxy server 630 can establish a TLS session with the associated multi-tenant API endpoint 605 of the service, as indicated at circle '5' of FIG. 6.

FIG. 7 is a flow diagram illustrating operations of a method 700 for per-customer TLS controls in a multi-tenant provider network according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the endpoint security services and/or the API endpoints of the other figures.

The operations 700 include, at block 702, receiving an Internet Protocol (IP) packet including a request to establish a transport layer security (TLS) session with an application programming interface (API) endpoint of a multi-tenant provider network, wherein the request includes supported TLS parameters. For example, the multi-tenant API endpoints 105, 205, 305, 405, and 505 described above receive requests to establish TLS sessions, sometimes referred to as a TLS Client Hello message.

The operations 700 further include, at block 704, obtaining permitted TLS parameters from a customer-defined TLS policy identified based at least in part on an indication of a customer included in the IP packet. As described above, customers can define TLS policies in a variety of ways, from permitted TLS versions and cipher suites to groups or classes of permitted TLS parameters. Such policies can be stored in TLS policy data, which can be backed by a database. A customer-specific identifier included with the packet including the request to establish the TLS session can be used to identify the applicable customer policy, if any, to identify permitted TLS parameters.

The operations 700 further include, at block 706, determining that the supported TLS parameters match the permitted TLS parameters. To proceed with TLS session establishment, the API endpoint determines that there is some agreement between the supported and permitted TLS parameters. Often there are many combinations of supported TLS versions and cipher suites, and many permitted combinations of TLS versions and cipher suites. As a result, the API endpoint will attempt to match at least one set of supported TLS parameters with at least one set of permitted TLS parameters.

The operations 700 further include, at block 708, establishing the requested TLS session. If the supported TLS parameters (from the client) are permitted by the customer's TLS policy, the TLS handshake can proceed and a session can be established. Otherwise, the API endpoint can terminate the connection attempt.

Figure 8:
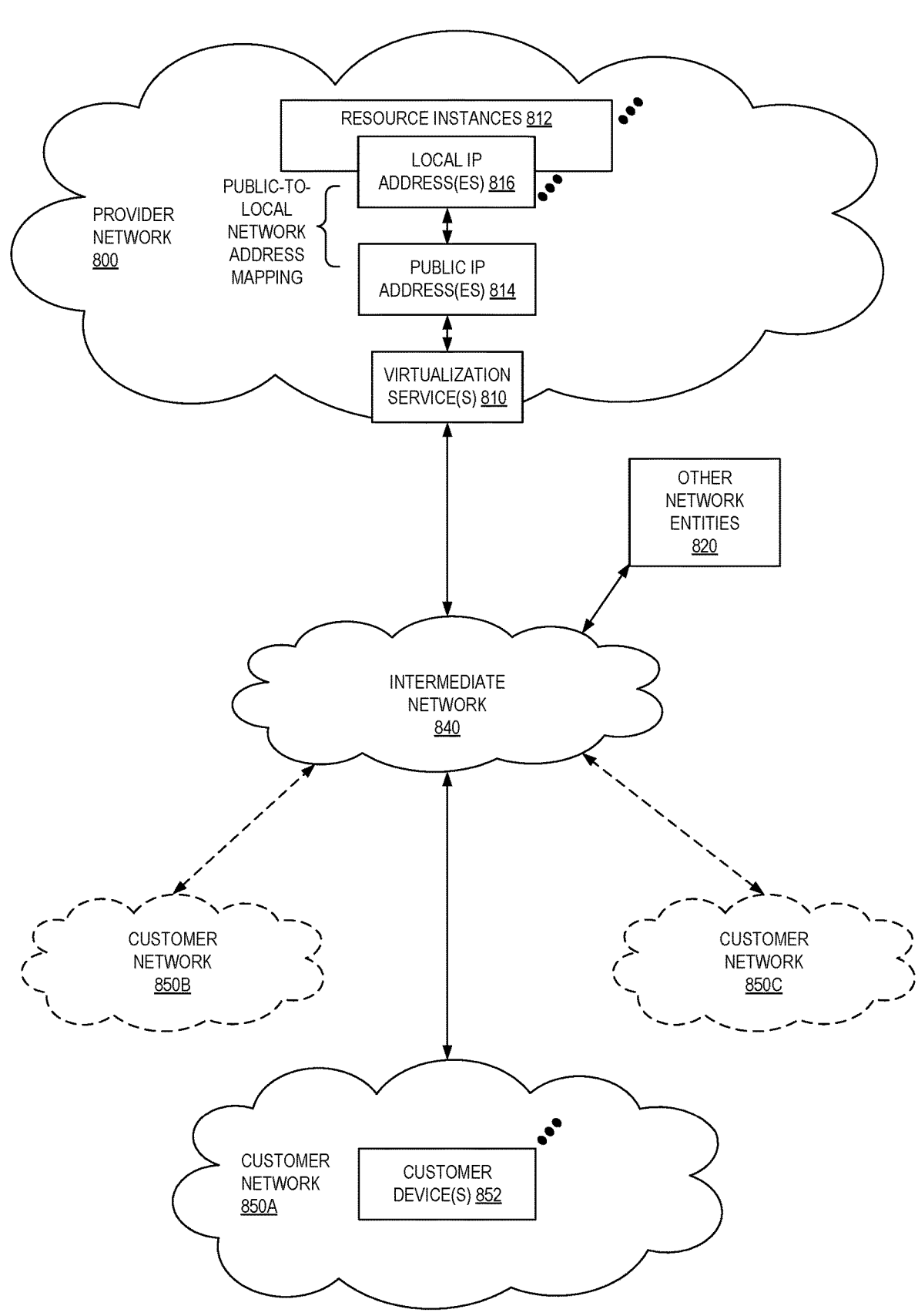
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
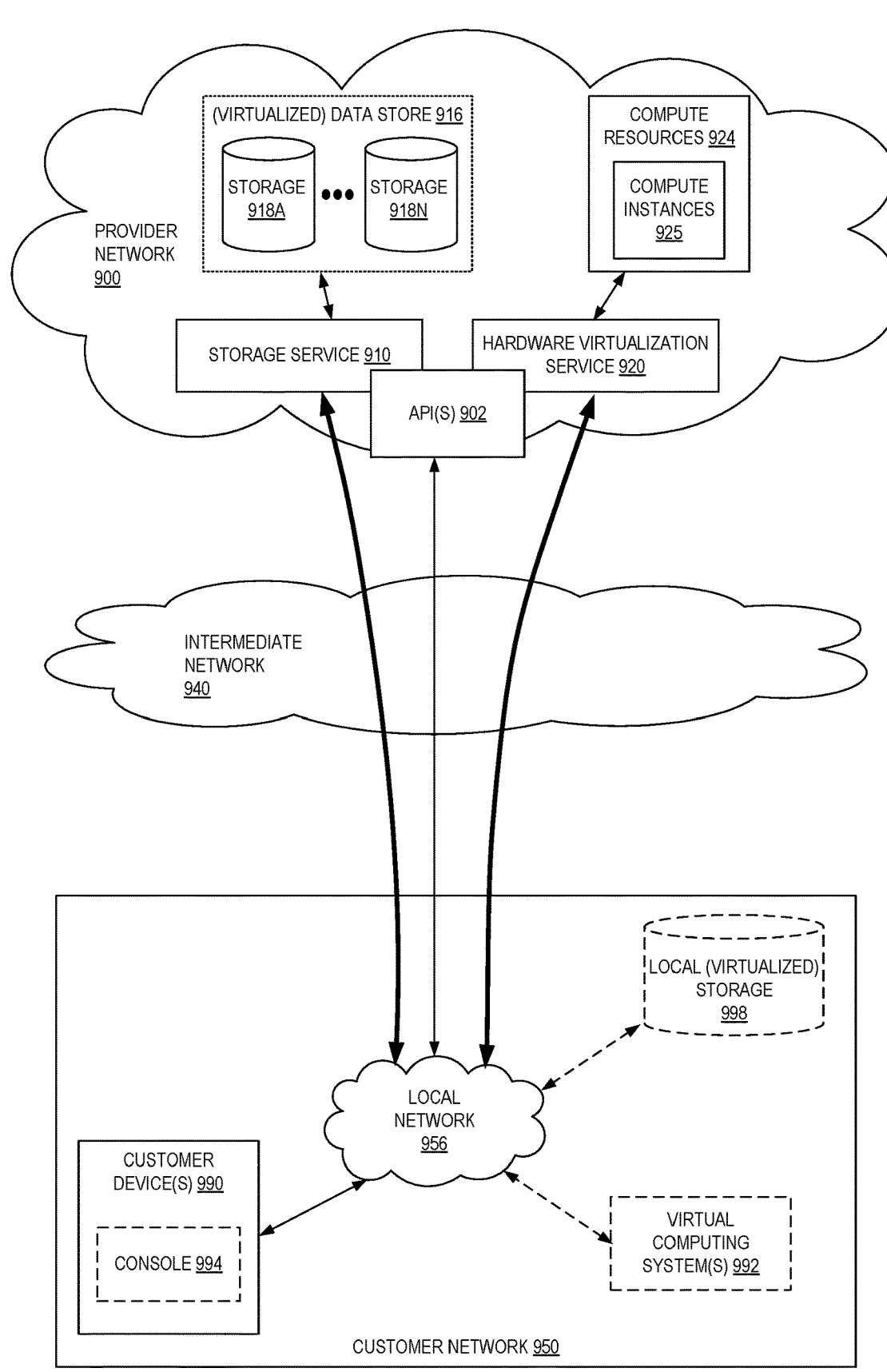
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
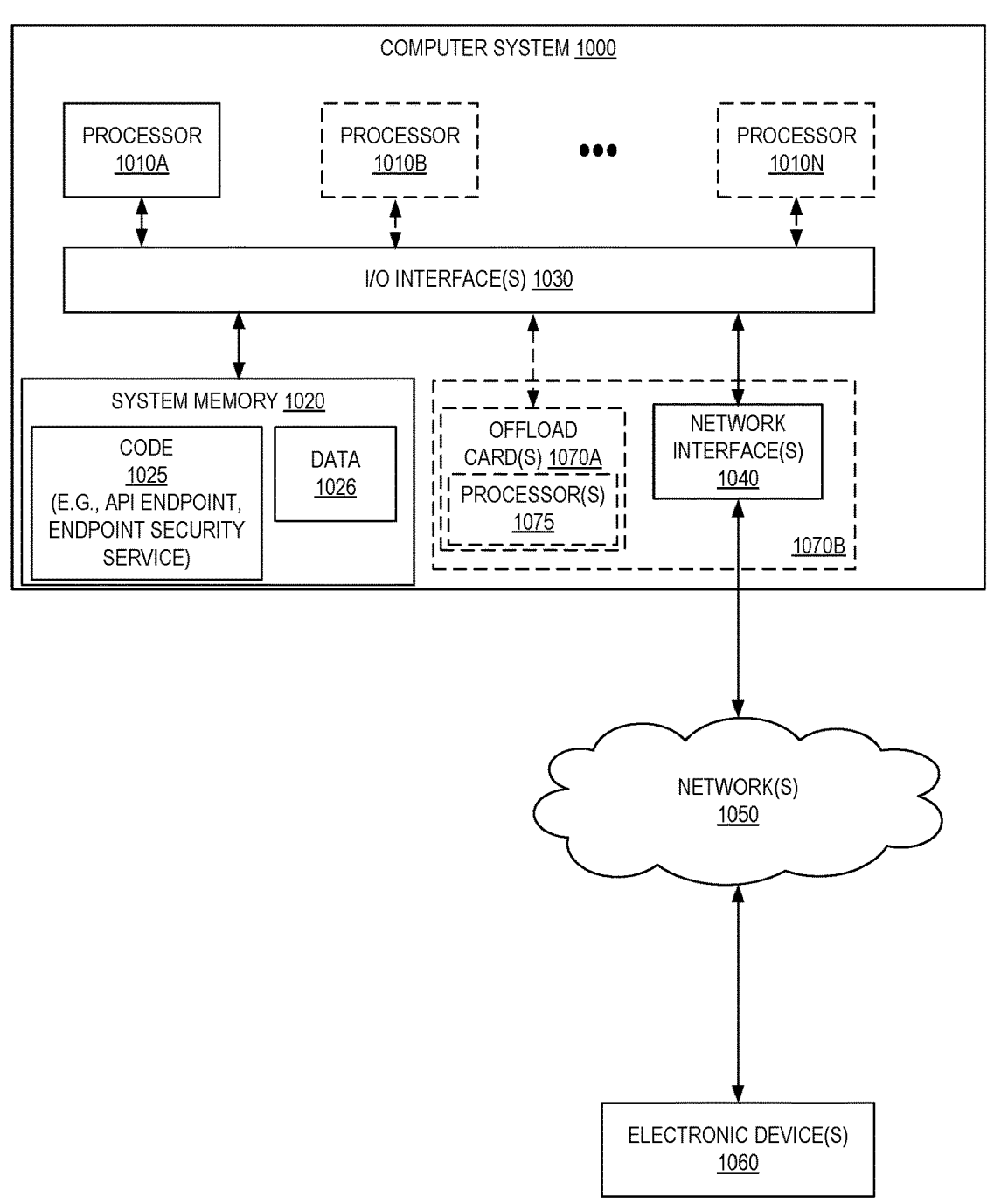
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as code 1025 (e.g., executable to implement, in whole or in part, the endpoint security services 101, 201, 301, 401, 501, 601, the API endpoints 105, 205, 305, 405, 505 and/or the proxy 630) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, at an endpoint security service of a multi-tenant provider network, a customer-initiated request to create a customer-defined transport layer security (TLS) policy for the customer, the request identifying a permitted TLS version and a permitted cipher suite to be included in the policy;
   storing the TLS policy in a database under a database key associated with the customer, the TLS policy including the permitted TLS version and the permitted cipher suite;
   receiving from a client device an Internet Protocol (IP) packet including a request to establish a TLS session with a multi-tenant application programming interface (API) endpoint associated with the customer, wherein the request includes a supported TLS version and a supported cipher suite to use to establish the requested TLS session;
   determining the database key based at least in part on an indication of the customer included in the IP packet;
   obtaining the permitted TLS version and the permitted cipher suite from the TLS policy stored in the database using the determined database key;
   determining that the supported TLS version matches the permitted TLS version and that the supported cipher suite matches the permitted cipher suite; and
   establishing the requested TLS session.

2. The computer-implemented method of claim 1, wherein the indication of the customer included in the IP packet is a Server Name Indication (SNI) of a TLS client hello message included in the IP packet, and wherein the SNI is a domain name assigned to the customer within the multi-tenant provider network.

3. The computer-implemented method of claim 1, wherein the indication of the customer included in the IP packet is a destination IP address of the IP packet, and wherein the destination IP address is an IPV6 address assigned to the customer within the multi-tenant provider network.

4. A computer-implemented method comprising:
   receiving from a client device an Internet Protocol (IP) packet including a request to establish a transport layer security (TLS) session with an application programming interface (API) endpoint of a multi-tenant provider network, wherein the request includes supported TLS parameters;
   obtaining permitted TLS parameters from a customer-defined TLS policy identified based at least in part on an indication of a customer included in the IP packet, the permitted TLS parameters including at least one permitted TLS version of a plurality of available TLS versions and at least one permitted cipher suite, wherein the customer-defined TLS policy is created based on a customer-initiated request identifying the permitted TLS parameters;
   determining that the supported TLS parameters match the permitted TLS parameters; and
   establishing the requested TLS session with the API endpoint, wherein the API endpoint is associated with the customer.

5. The computer-implemented method of claim 4, wherein the customer-defined TLS policy is stored under a database key in a database of a database service, and wherein obtaining the permitted TLS parameters from the customer-defined TLS policy identified based at least in part on the indication of the customer included in the IP packet includes:
   determining the database key based at least in part on the indication of the customer in the IP packet; and
   obtaining the permitted TLS parameters from the customer-defined TLS policy stored in the database using the determined database key.

6. The computer-implemented method of claim 5, wherein the indication of the customer included in the IP packet is a source IP address of the IP packet.

7. The computer-implemented method of claim 6, further comprising:
   receiving a request to associate the customer-defined TLS policy with an IP address prefix managed by the customer, the IP address prefix including the source IP address of the IP packet; and wherein the identification of the customer-defined TLS policy is based at least in part on the inclusion of the source IP address of the IP packet in the IP address prefix.

8. The computer-implemented method of claim 5, wherein the indication of the customer included in the IP packet is a customer identifier included in packet metadata by a virtual network endpoint or an ingress service of a multi-tenant provider network.

9. The computer-implemented method of claim 5, wherein the indication of the customer included in the IP packet is a Server Name Indication (SNI) of a TLS client hello message included in the IP packet.

10. The computer-implemented method of claim 9, wherein the SNI is a domain name assigned to the customer within the multi-tenant provider network.

11. The computer-implemented method of claim 5, wherein the indication of the customer included in the IP packet is a destination IP address of the IP packet.

12. The computer-implemented method of claim 11, wherein the destination IP address is an IPV6 address assigned to the customer within the multi-tenant provider network.

13. The computer-implemented method of claim 5, further comprising:

receiving a request to create the customer-defined TLS policy, the request identifying the permitted TLS parameters; and storing the customer-defined TLS policy in the database under the database key, the customer-defined TLS policy including the permitted TLS parameters.

14. The computer-implemented method of claim 4, further comprising:

receiving another IP packet including another request to establish a TLS session with the API endpoint, wherein the other request includes supported TLS parameters;

determining that no customer-defined TLS policy applies to the other request;

determining that the supported TLS parameters of the other request match a default set of TLS parameters; and establishing the requested TLS session.

15. The computer-implemented method of claim 4, wherein the supported TLS parameters include a supported TLS version and a supported cipher suite, and wherein the permitted TLS parameters include a permitted TLS version and a permitted cipher suite, and wherein determining that the supported TLS parameters match the permitted TLS parameters comprises determining that the supported TLS version matches the permitted TLS version and that the supported cipher suite matches the permitted cipher suite.

16. A system comprising:

a first one or more electronic devices to implement a database including customer transport layer security (TLS) policies in a multi-tenant provider network; and a second one or more electronic devices to implement a multi-tenant application programming interface (API) endpoint in the multi-tenant provider network, the multi-tenant API endpoint including instructions that upon execution cause the endpoint to:

receive from a client device an Internet Protocol (IP) packet including a request to establish a TLS session with the multi-tenant API endpoint, wherein the request includes supported TLS parameters;

obtain permitted TLS parameters from a customer-defined TLS policy in the database, the customer-defined TLS policy identified based at least in part on an indication of a customer included in the IP packet, the permitted TLS parameters including at least one permitted TLS version of a plurality of available TLS versions and at least one permitted cipher suite, wherein the customer-defined TLS policy is created based on a customer-initiated request identifying the permitted TLS parameters;

determine that the supported TLS parameters match the permitted TLS parameters; and establish the requested TLS session with the API endpoint, wherein the API endpoint is associated with the customer.

17. The system of claim 16, wherein the indication of the customer included in the IP packet is a source IP address of the IP packet.

18. The system of claim 16, wherein the indication of the customer included in the IP packet is a customer identifier included in packet metadata by a virtual network endpoint or an ingress service of a multi-tenant provider network.

19. The system of claim 16, wherein the indication of the customer included in the IP packet is a Server Name Indication (SNI) of a TLS client hello message included in the IP packet.

20. The system of claim 16, wherein the indication of the customer included in the IP packet is a destination IP address of the IP packet.

*    *    *    *    *